United States Patent [19]
Murakami

[11] Patent Number: 5,434,484
[45] Date of Patent: Jul. 18, 1995

[54] RASTER LEFT-AND-RIGHT DISTORTIONS CORRECTING APPARATUS

[75] Inventor: Yasuo Murakami, Nagasaki, Japan

[73] Assignee: Mitsubishi Denki Kabushiki Kaisha, Tokyo, Japan

[21] Appl. No.: 176,468

[22] Filed: Jan. 3, 1994

[30] Foreign Application Priority Data

Mar. 2, 1993 [JP] Japan ................... 5-064818
Aug. 25, 1993 [JP] Japan ................... 5-210718

[51] Int. Cl.⁶ .................. G09G 1/04; H01J 29/70
[52] U.S. Cl. .................. 315/371; 315/408; 315/411
[58] Field of Search ............. 315/367, 371, 411, 408

[56] References Cited

U.S. PATENT DOCUMENTS

| | | | |
|---|---|---|---|
| 4,063,134 | 12/1977 | Idia | 315/371 |
| 4,956,586 | 9/1990 | Gipson et al. | 315/387 |
| 4,956,587 | 9/1990 | Kitou | 315/408 |
| 5,276,604 | 1/1994 | Messman | 315/411 |

Primary Examiner—Gregory C. Issing
Attorney, Agent, or Firm—Burns, Doane, Swecker & Mathis

[57] ABSTRACT

Disclosed herein is a raster left-and-right distortions correcting apparatus for correcting left and right distortions of a raster. According to the raster left-and-right distortions correcting apparatus, parameters for correcting the left and right distortions peculiar to a CRT of the raster left-and-right distortions correcting apparatus are stored in an E²PROM. The parameters are then electrically processed by a DSP. Thereafter, an analog voltage obtained by D-A converting the result of processing is supplied to a comparator. The comparator compares the analog voltage with a sawtooth wave voltage synchronized with a horizontal synchronizing signal. A switch is controlled depending on the width of a pulse on the basis of the result of comparison to thereby switch a power source for a horizontal output circuit.

12 Claims, 17 Drawing Sheets

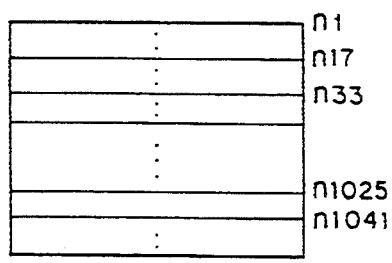
FIG. 6(a)
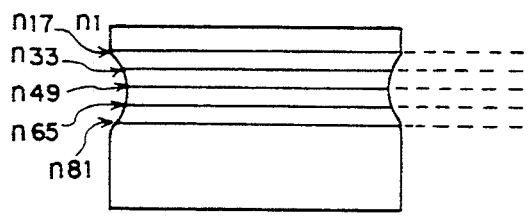
FIG. 6(b)
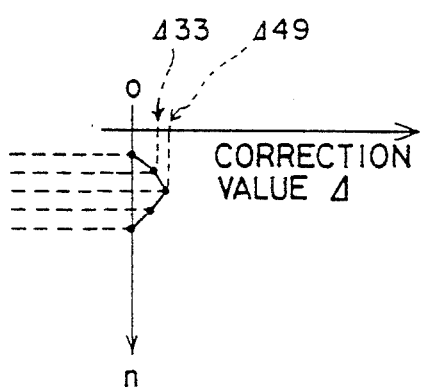
FIG. 6(c)
FIG. 7
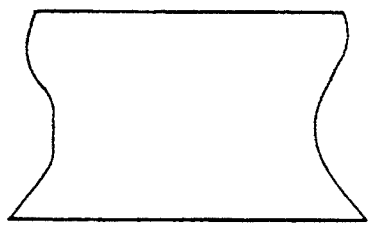
FIG. 9(a)    FIG. 9(b)
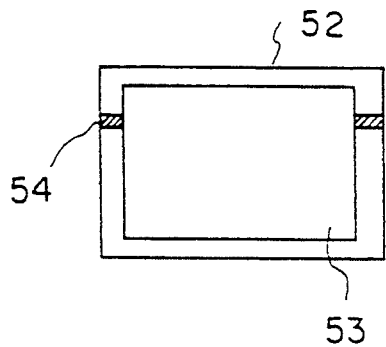
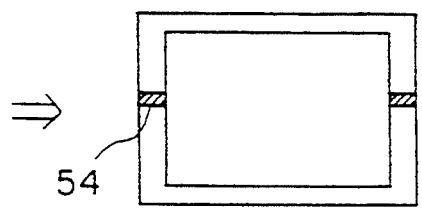

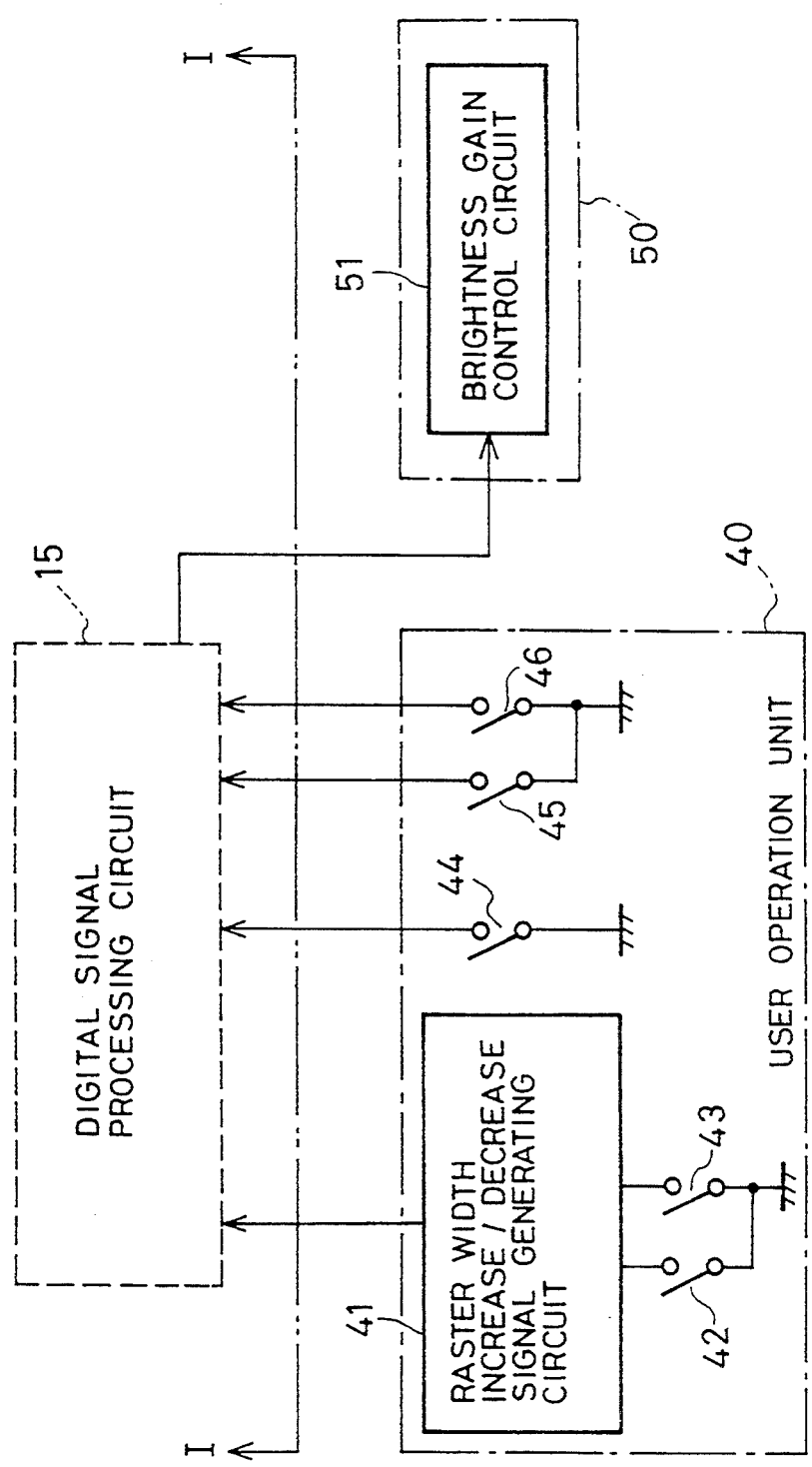

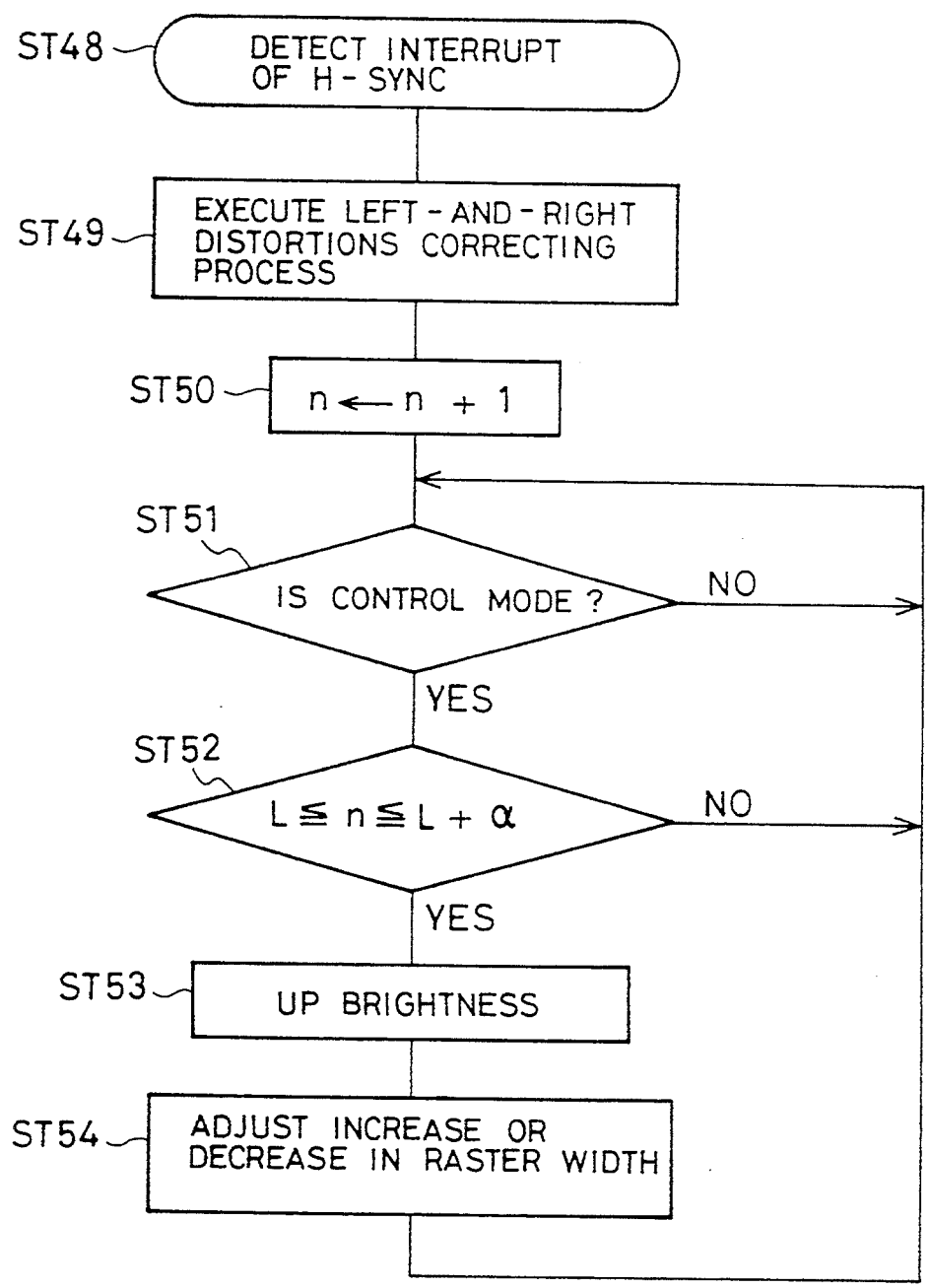

FIG.24
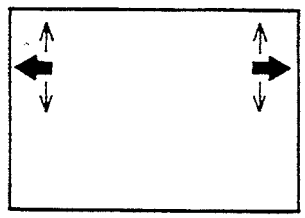
FIG.25
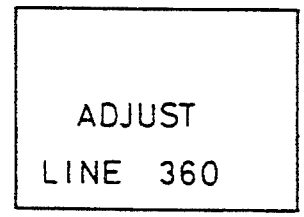
FIG.26
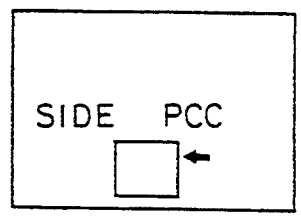
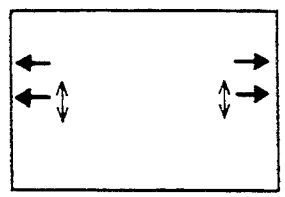
FIG.27(a)
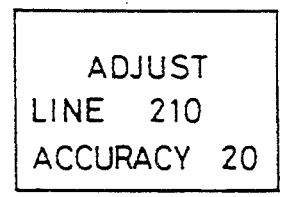
FIG.27(b)

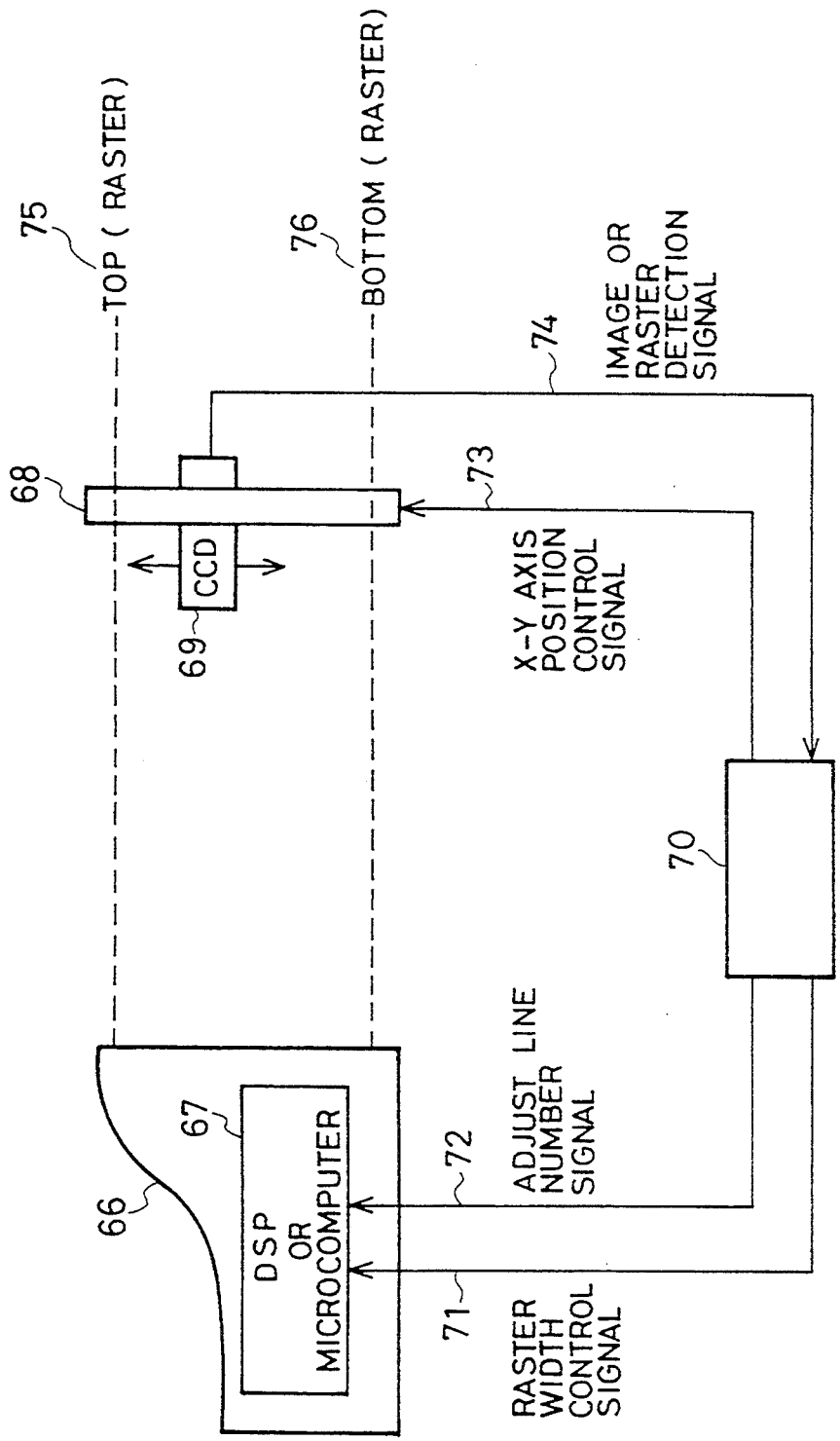

RASTER LEFT-AND-RIGHT DISTORTIONS CORRECTING APPARATUS

BACKGROUND OF THE INVENTION

1. Field of the Invention

The present invention relates to a raster left-and-right distortions correcting apparatus for correcting distortions of scanning lines such as left and right pin-cushion distortions which appear in a CRT (cathode ray tube) display device.

2. Description of the Related Art

FIG. 29 is a view showing the structure of a conventional raster left-and-right pin-cushion distortions correcting apparatus which has been disclosed in Japanese Patent Application Publication No. 3-74496. There are shown in FIG. 29, a vertical deflection coil 1, a vertical deflection output circuit 2 for supplying a vertical deflection current $I_V$ to the vertical deflection coil 1, a horizontal deflection coil 3, a horizontal deflection output circuit 4 for supplying a horizontal deflection current $I_H$ to the horizontal deflection coil 3, a waveform shaping circuit 5 for generating a parabola waveform voltage $V_P$ having a vertical deflection period in response to the vertical deflection current $I_V$ supplied from the vertical deflection output circuit 2, and a modulator 6 for amplitude-modulating the horizontal deflection current $I_H$ flowing in the horizontal deflection coil 3 based on the parabola waveform voltage $V_P$.

FIG. 30 is a view specifically showing the configuration of the waveform shaping circuit 5. The waveform shaping circuit 5 is made up of a capacitor C which integrates a sawtooth-like vertical deflection current $I_V$ having a period T and an amplitude a, which is supplied from a vertical deflection output circuit 2 via a vertical deflection coil 1 and generates a parabola waveform voltage $V_P$.

FIG. 31 is a view for describing left and right distortions of scanning lines on the screen of a CRT, which are corrected by the raster left-and-right pin-cushion distortions correcting apparatus. When horizontal and vertical deflection coils in a normal color CRT are normally so designed that a convergence miss is minimized, the shape of a raster is not represented in the form of a proper rectangle indicated by dotted lines as shown in FIG. 31. Thus, so-called left and right pin-cushion distortions appear in which the left and right sides of the raster are inwardly bent in bow form as indicated by solid lines.

The operation of the raster left-and-right pin-cushion distortions correcting apparatus will now be described below.

When a vertical synchronizing signal is supplied to the vertical deflection output circuit 2, the vertical deflection output circuit 2 supplies the vertical deflection current $I_V$ having the sawtooth waveform to each of the vertical deflection coil 1 and the waveform shaping circuit 5. Thus, the waveform shaping circuit 5 integrates the vertical deflection current $I_V$ using the capacitor C shown in FIG. 30 so as to generate the parabola waveform voltage $V_P$ and supplies it to the modulator 6.

When, on the other hand, a horizontal synchronizing signal is supplied to the horizontal deflection output circuit 4, the horizontal deflection output circuit 4 supplies the horizontal deflection current $I_H$ having a sawtooth waveform of a horizontal period to the horizontal deflection coil 3. The horizontal deflection current $I_H$ is amplitude-modulated based on the parabola waveform voltage $V_P$ supplied to the modulator 6. As a result, the current $I_H$ modulated based on the parabola waveform voltage $V_P$ having a vertical deflection period flows in the horizontal deflection coil 3. Thus, the length of each scanning line on the raster is corrected so that the left and right pin-cushion distortions are corrected.

Described specifically, assuming that the vertical deflection period, the amplitude of the sawtooth waveform and the time are represented as T, a and t respectively, an instantaneous value i of the vertical deflection current $I_V$ flowing in the vertical deflection coil 1 is represented as follows:

$$i = (a/T) \cdot t \tag{1}$$

Thus, a voltage $V_C$ which appears across the capacitor C is represented as follows:

$$V_C = (1/C) \cdot \int i dt = \{a/(2CT)\} \cdot t^2 \tag{2}$$

A zero peak value $V_P$ of the voltage $V_C$ is given as a voltage value at the time of $t = T/2$. Therefore, if the voltage $V_C$ at the time of $t = T/2$ is represented as $[V_C]$, then the $V_P$ is given as follows:

$$V_P = [V_C] = aT/(8C) \tag{3}$$

The parabola wave in which the voltage $V_P$ is regarded as the peak value, varies in proportion to the vertical deflection period T or in inverse proportion to a vertical deflection frequency. As a result, the horizontal deflection current $I_H$ is modulated so as to reach the maximum in the vicinity of the center of the vertical deflection period T to thereby correct the left and right pin-cushion distortions bent in bow form.

Since the conventional raster left-and-right pin-cushion distortions correcting apparatus is constructed as described above, only the typical left and right pin-cushion distortions indicated by the solid lines in FIG. 31 can be corrected. However, the CRT actually includes factors of distortions which cannot be removed by the parabola waveform due to a variation in its structure and the like. Therefore, the conventional raster left-and-right pin-cushion distortions correcting apparatus is accompanied by a problem that the left and right distortions having factors other than the pincushion distortions cannot be completely removed.

A method of generating a parabola waveform voltage having a vertical deflection period is considered as an alternative to the circuit shown in FIG. 30. However, even in either case, the amplitude of a vertical deflection frequency varies so as to reach the maximum in the vicinity of the center of the vertical deflection period so long as an integration process is effected, thus causing problems that other left and right distortions cannot be corrected by using such a method as it is and even when typical pin-cushion distortions are corrected, they need to be readjusted each time a vertical deflection frequency to be handled is changed.

SUMMARY OF THE INVENTION

The present invention has been made to solve the aforementioned problems.

A first object of the present invention is to provide a raster left-and-right distortions correcting apparatus capable of easily correcting left and right distortions having arbitrary shapes.

A second object of the present invention is to provide a raster left-and-right distortions correcting apparatus that can be easily operated when left and right distortions having arbitrary shapes are corrected.

According to one aspect of the raster left-and-right distortions correcting apparatus of the present invention, the length of each of scanning lines is computed by a digital signal processing device at a high speed based on each of parameters stored in a storing means in advance. An analog voltage obtained by converting the result of computation into an analog signal is compared with a sawtooth voltage. A scan time interval is decided based on the result of comparison so that the length of each scanning line is adjusted.

According to another aspect of the raster left-and-right distortions correcting apparatus of the present invention, a scanning line corresponding to the next line is corrected using the result of correction of the scanning line corresponding to the previous line. Therefore, the digital signal processing circuit can effectively correct any distortion of the scanning lines.

According to a further aspect of the raster left-and-right distortions correcting apparatus of the present invention, the corrective computation is carried out every a plurality of scanning lines. Therefore, the raster left-and-right distortions correcting apparatus provides less memory capacity and processing time and is particularly effective in correction of large and arbitrary left-and-right distortions.

According to a still further aspect of the raster left-and-right distortions correcting apparatus of the present invention, the length of each of scanning lines is computed by a digital signal processing device at a high speed. An analog voltage obtained by converting the result of computation into an analog signal is compared with a sawtooth voltage. A scan time interval is decided based on the result of comparison so that the length of each scanning line is adjusted.

According to a still further aspect of the raster left-and-right distortions correcting apparatus of the present invention, when an operator specifies each scanning line corresponding to an object for correcting left and right distortions using a scanning line specifying means, the position of the specified scanning line is displayed on the screen by a scanning line position displaying means. As a result, the operator can effectively adjust the length of the specified scanning line using an adjust signal generating means while monitoring the displayed position on the screen.

According to a still further aspect of the raster left-and-right distortions correcting apparatus of the present invention, the brightness of a portion of the scanning line specified by the operator is raised and that portion is displayed on the screen to thereby indicate the position of the specified scanning line.

According to a still further aspect of the raster left-and-right distortions correcting apparatus of the present invention, the length of the scanning line specified by the operator or the lengths of a plurality of scanning lines including the specified scanning line are made shorter or longer than the lengths of other scanning lines and displayed on the screen to thereby indicate the position of the specified scanning line or the positions of the plurality of scanning lines.

According to a still further aspect of the raster left-and-right distortions correcting apparatus of the present invention, a predetermined color signal is superimposed on a video signal corresponding to the scanning line specified by the operator and the result of superimposition is displayed on the screen to thereby indicate the position of the specified scanning line.

According to a still further aspect of the raster left-and-right distortions correcting apparatus of the present invention, an image signal for indicating the position of the scanning line specified by the operator is generated and displayed on the screen.

According to a still further aspect of the raster left-and-right distortions correcting apparatus of the present invention, raster left-and-right distortions correcting positions are detected according to an operation time interval of a user operation unit. The position of each scanning line, which is adjusted based on the result of detection, is displayed on the screen.

According to a still further aspect of the raster left-and-right distortions correcting apparatus of the present invention, the operator specifies a plurality of number of scanning lines corresponding to objects for correcting left and right distortions at a time using the scanning line specifying means.

According to a still further aspect of the raster left-and-right distortions correcting apparatus of the present invention, the operator effectively specifies a desired number of scanning lines using the scanning line specifying means.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIGS. 6(a), (b) and (c) are a view illustrating a distortion correcting operation of the raster left-and-right distortions correcting apparatus shown in FIG. 1;

FIG. 7 is a view showing another example of distortions of a raster;

FIG. 8 is a block diagram depicting a raster left-and-right distortions correcting apparatus according to another embodiment of the present invention;

FIGS. 9(a) and (b) are a view for describing a CRT screen employed in the raster left-and-right distortions correcting apparatus shown in FIG. 8;

FIG. 11 is a flowchart for describing the operation of the raster left-and-right distortions correcting apparatus shown in FIG. 8;

FIG. 24 is a view for describing one example of a display screen used in the raster left-and-right distortions correcting apparatus shown in FIG. 23;

FIG. 25 is a view for describing another example of the display screen used in the raster left-and-right distortions correcting apparatus shown in FIG. 23;

FIG. 26 is a view for describing a further example of the display screen used in the raster left-and-right distortions correcting apparatus shown in FIG. 23;

FIG. 27 is a view for describing a still further example of the display screen used in the raster left-and-right distortions correcting apparatus shown in FIG. 23;

FIG. 28 is a block diagram showing a raster left-and-right distortions correcting apparatus according to a still further embodiment of the present invention, which automatically adjusts left and right distortions;

DETAILED DESCRIPTION OF THE PREFERRED EMBODIMENTS

Preferred embodiments of the present invention will hereinafter be described in detail with reference to the accompanying drawings.

EMBODIMENT 1

Figure 1:
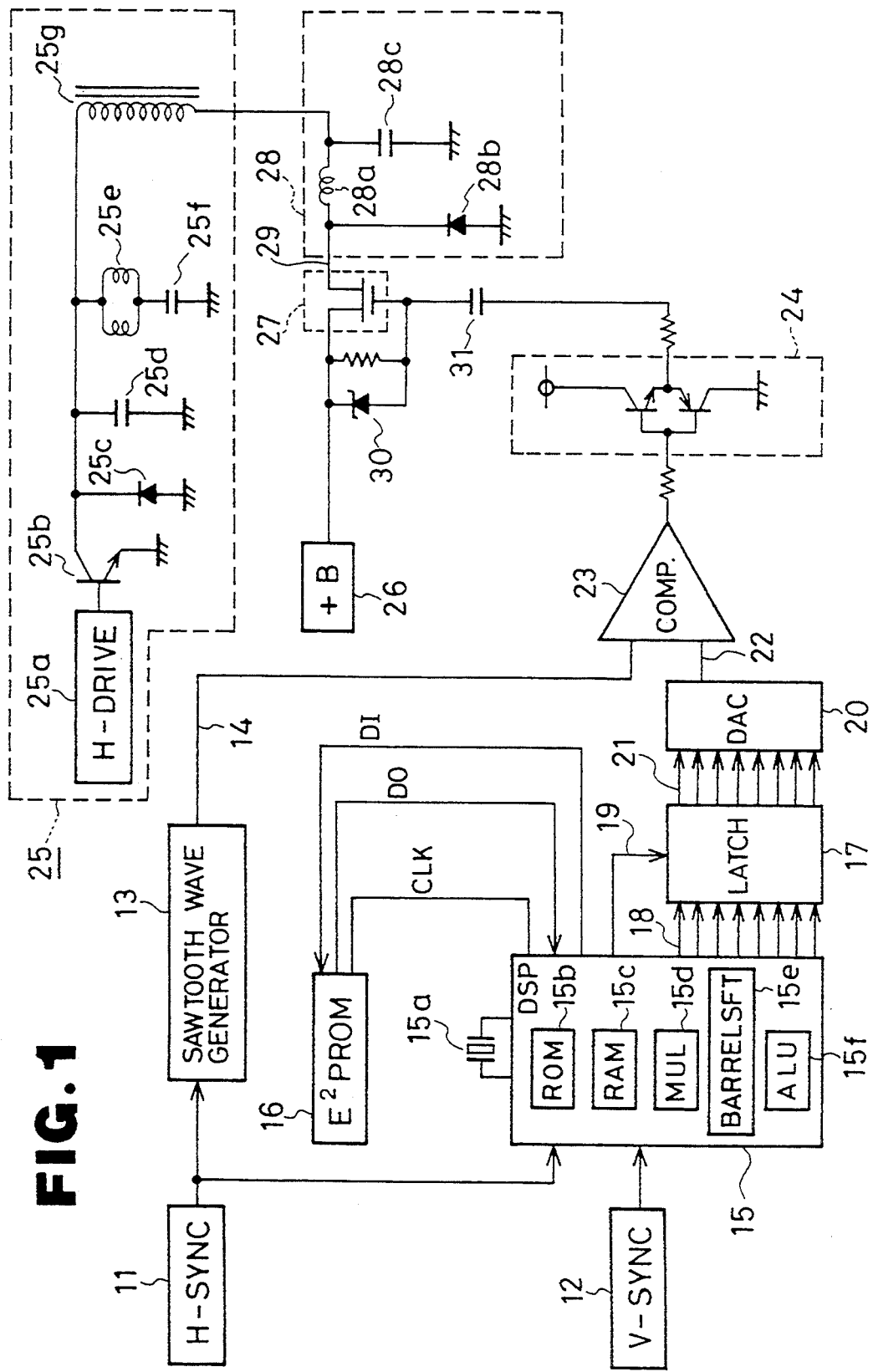
FIG. 1 is a view showing the structure of a raster left-and-right distortions correcting apparatus according to one embodiment of the present invention.

FIG. 1 is a view showing the structure of a raster left-and-right distortions correcting apparatus according to one embodiment of the present invention. In FIG. 1, reference numeral 11 indicates a horizontal synchronizing signal (hereinafter abbreviated as "H-SYNC") supplied from either the outside or the inside of a display device. Designated at numeral 12 is a vertical synchronizing signal (hereinafter abbreviated as "V-SYNC") supplied from either the outside or the inside. Reference numeral 13 denotes a sawtooth generator for generating a sawtooth wave voltage 14 at a periodic time interval synchronized with the H-SYNC 11. Further, reference numeral 15 indicates a digital signal processing circuit (hereinafter abbreviated as "DSP") for electrically processing a digital signal in synchronism with the H-SYNC 11 and the V-SYNC 12. The DSP 15 employed in the present embodiment includes a crystal-controlled oscillator 15a, a ROM 15b, a RAM 15c, a multiplier 15d, a barrel shifter 15e and an arithmetic and logic unit 15f.

Designated at numeral 16 is an E²PROM (Electrically Erasable and Programmable Read-Only Memory) for storing therein data used for signal processing of the DSP 15 and data subjected to its signal processing. Further, the E²PROM serves as a storing means for writing input data $D_I$ therein and reading output data $D_O$ therefrom in response to a clock CLK supplied from the DSP 15. Reference numeral 17 indicates a latch for temporarily retaining output data 18 electrically processed by the DSP 15 in response to a latch signal 19 supplied from the DSP 15. Reference numeral 20 indicates a D-A converter (Digital-to-Analog converter) for converting data 21 held in the latch 19 into an analog voltage 22. Designated at numerals 23 and 24 are respectively a comparator for comparing the sawtooth wave voltage 14 and the analog voltage 22 and an amplifier comprised of push-pull connected transistors for shaping the waveform of an output generated from the comparator 23 and amplifying the same.

Designated at numeral 25 is a horizontal output circuit for driving and displaying horizontal scanning lines. The horizontal output circuit 25 comprises a horizontal drive circuit 25a, a horizontal output transistor 25b, a damper diode 25c, a resonance capacitor 25d, a horizontal deflection coil 25e, an S-shape correction capacitor 25f and a horizontal output transformer 25g in a manner known to date.

Reference numeral 26 indicates a power source used for the horizontal output circuit 25 and reference numeral 27 indicates a switch for switching the voltage (+B) of the power source 26, which is made up of an FET (Field Effect Transistor) of a PMOS (Metal Oxide Semiconductor) type such as a normal Off type, which is controlled based on the output of the amplifier 24. Designated at numeral 28 is a smoothing circuit for smoothing a voltage 29 outputted from the switch 27 and supplying the smoothed voltage to the horizontal output circuit 25. The smoothing circuit 28 comprises a choke coil 28a, a diode 28b, a capacitor 28c and the like. Reference numeral 30 indicates a zener diode used for the protection of the MOSFET 27 and reference numeral 31 indicates a capacitor for removing a DC (Direct Current) component from the output of the amplifier 24 and supplying the so-processed output to the gate of the MOSFET 27.

The operation of the raster left-and-right distortions correcting apparatus will now be described below.

Figures 2A, 2B:
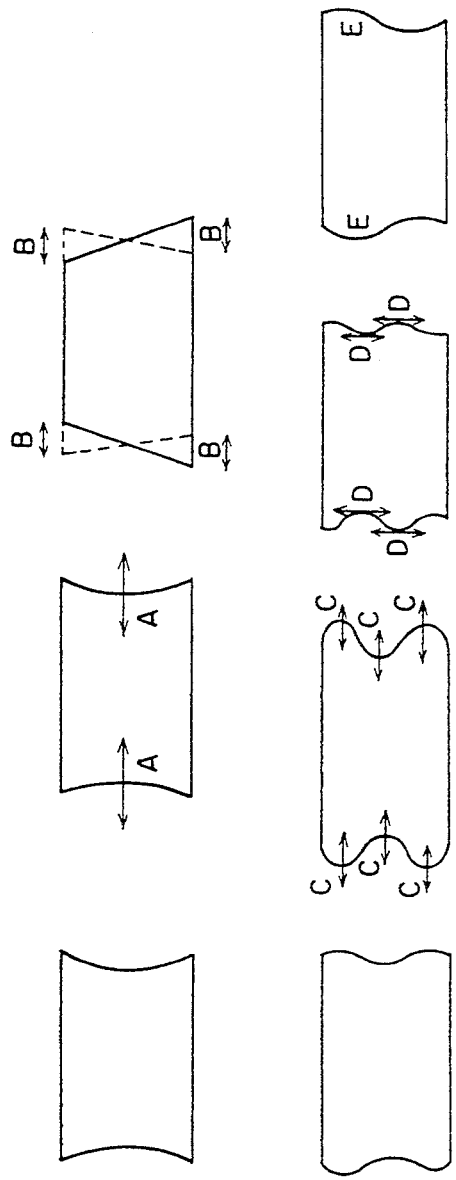
FIGS. 2A and 2B are a view for describing one example of various left-and-right distortions of rasters.

FIG. 2 illustrates various left and right symmetrical distortions of rasters. In the same drawing, the symbols A, B, C, D and E represent parameters indicative of the phase, period and amplitude, for correcting the respective distortions. The symbol A denotes the parameter for correcting the degree of the pincushion. The symbol B indicates the parameter for correcting the inclinations of the left-and-right rasters. The symbol C represents the parameter for correcting the degrees of the left and right distortions. The symbol D represents the parameter for correcting the phases of the raster distortions, i.e., upper and lower positions. Further, the symbol E denotes the parameter for correcting the periods of the raster distortions, i.e., changes in states of the distortions. FIG. 2A shows left-and-right pin-cushion distortions and FIG. 2B illustrates distortions referred to as SEAGULL distortions.

Various values indicative of the respective parameters A through E have been stored in the ROM 15$b$ of the DSP 15 in advance. In the present embodiment, the value most suitable for correction of left and right distortions developed in a CRT employed in the display device is selected from the values of the respective parameters A through E, which have been stored in the ROM 15$b$. The selected value is transferred to and registered in the E$^2$PROM 16. The length of each of scanning lines on rasters is adjusted for each scanning line using the selected value to thereby eliminate the left and right distortions.

Various methods are known as a method of selecting the optimum parameter value from the ROM 15$b$. The following method is however used as an example. When a CRT is supplied with and operated by data which provides a normal raster, a raster having left and right distortions corresponding to the CRT is actually produced. Therefore, the produced raster is photographically sensed by a camera to thereby generate a sensed signal. Then, the degrees of the left and right distortions are examined based on the sensed signal. Thereafter, the values indicative of the respective parameters A through E are successively selected from the ROM 15$b$ according to the degrees referred to above and supplied to the E$^2$PROM 16.

The operation for correcting the left and right distortions using the above parameters will now be described below.

When the V-SYNC 12 is supplied to the DSP 15, the DSP 15 performs an arithmetic operation for deciding the length of a scanning line after the scanning line being scanned at present each time the H-SYNC 11 is supplied. The values of the parameters A through E stored in the E$^2$PROM 16 are first stored in the RAM 15$c$ and calculations are then made in accordance with the following equations, for example, using the values.

$$y_1 = -A(n-B)^2 \quad (4)$$

$$y_2 = C\sin\{E\cdot\pi(n/n_T) - D\} \quad (5)$$

Where the above equations (4) and (5) respectively represent an equation for correcting the pin-cushion distortions and an equation for correcting the SEA-GULL distortions, the symbols A, B, C, D and E in these equations respectively represent the parameters stored in the E$^2$PROM 16, n is the number of lines at present time, i.e., an integer representing which line is now being scanned as viewed from the upper portion of the raster, and $n_T$ represents the total number of lines on the raster.

Figure 3:
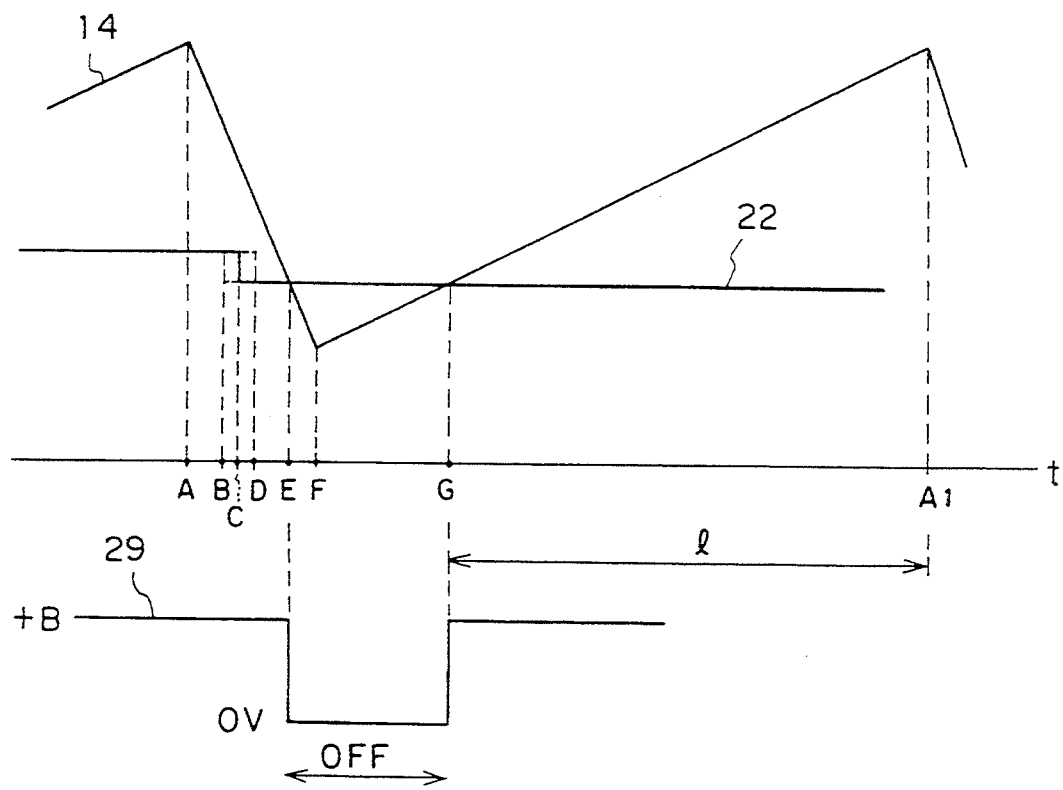
FIG. 3 is a waveform chart showing a distortion correcting operation of the raster left-and-right distortions correcting apparatus shown in FIG. 1.

After the above equations $y_1$ and $y_2$ have been determined, the DSP 15 further calculates $(y_1+y_2)$ as a final correction value and outputs it as data 18 of 8 bits or more, for example. It is needless to say that when the above $y_1$ and $y_2$ are respectively calculated by the DSP 15 or when the $(y_1+y_2)$ is determined, such correction values may be determined using a general approximation expression such as such an approximation expression representing each of the respective equations in the form of Maclaurin's expansion. The data 18 is retained in the latch 17 based on the latch signal 19. The data 21 held in the latch 17 is converted into the analog voltage 22 by the D-A converter 20 as shown in FIG. 3. The analog voltage 22 is outputted at a point C shown in FIG. 3. The level of the analog voltage 22 prior to the point C corresponds to the line being scanned at present. Points B and D represent errors which appear upon outputting the analog voltage 22, based on errors in the H-SYNC 11 detected when the clock generated from the crystal-controlled oscillator 15$a$ of the DSP 15 rises or falls.

The analog voltage 22 is supplied to one of input terminals of the comparator 23. The other input terminal of the comparator 23 is supplied with the sawtooth voltage 14 shown in FIG. 3 synchronized with the H-SYNC 11 from the sawtooth generator 13. The point C exists within a blanking period between the points A and F of the sawtooth voltage 14. The comparator 23 compares the sawtooth voltage 14 and the analog voltage 22 and outputs a negative logic pulse (voltage of 0 V) during a period (between E and G) in which the analog voltage 22 exceeds the sawtooth voltage 14. The negative logic pulse is supplied to the gate of the MOSFET of the switch 27 via the amplifier 24 and the capacitor 31 so that the switch 27 is changed from an ON state to an OFF state.

As a result, the output voltage 29 shown in FIG. 3 appears at the drain of the MOSFET 27. The voltage 29 is smoothed by the smoothing circuit 28 and supplied to the horizontal output circuit 25 as an operating power source voltage. Thus, the power source voltage supplied to the horizontal output circuit 25 is adjusted by controlling a turning-OFF period of the switch 27. In other words, the power source voltage supplied to the horizontal output circuit 25 is corrected by the PWM (Pulse Width Modulation) control of the switch 27, so that the lengths of the horizontal scanning lines are corrected depending on the computed amount of distortions.

A normal processing speed of the DSP 15 is 100 nsec or so. The processing speed ranges from 2 $\mu$sec to 3 $\mu$sec between the points A to F. Therefore, if a settling time of 250 nsec or shorter, for example, is used in the D-A converter 20, then the DSP 15 can perform a processing operation from the start point A to the point C during the period of 500 nsec. After the point C, the output of the D-A converter 20 is kept constant by the latch 17. The calculation of the length of the next line may be finished until the point A$_1$ shown in FIG. 3 at the latest is reached. Even when the normal horizontal scan frequency is about 100 kHz, the DSP 15 can be sufficiently operated at the known processing speed thereof because 7 μsec or so exists till the point $A_1$.

Figure 4:
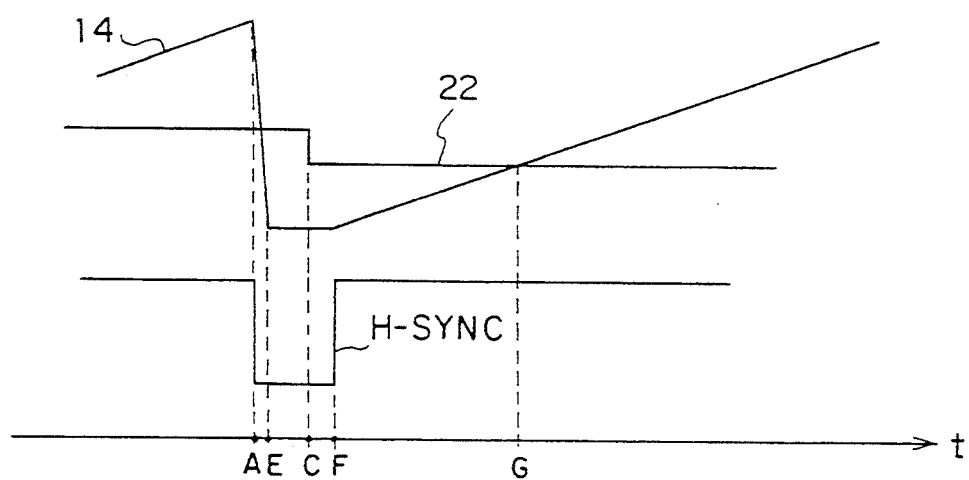
FIG. 4 is a waveform chart illustrating another distortion correcting operation.

FIG. 4 shows the relationship between an actual waveform of the sawtooth voltage 14 and the H-SYNC 11. The sawtooth generator 13 is activated so that the transistor thereof is controlled based on the H-SYNC 11 to charge or discharge the capacitor thereof to thereby generate the sawtooth voltage 14. Further, since the transistor is turned ON during the period between the points A and F and the capacitor is instantaneously discharged, the inclination of the sawtooth voltage 14 is made sharp during that period as shown in FIG. 4. Even in this case, however, the DSP 15 can sufficiently meet such a situation at the processing time set to the DSP 15.

Figure 5:
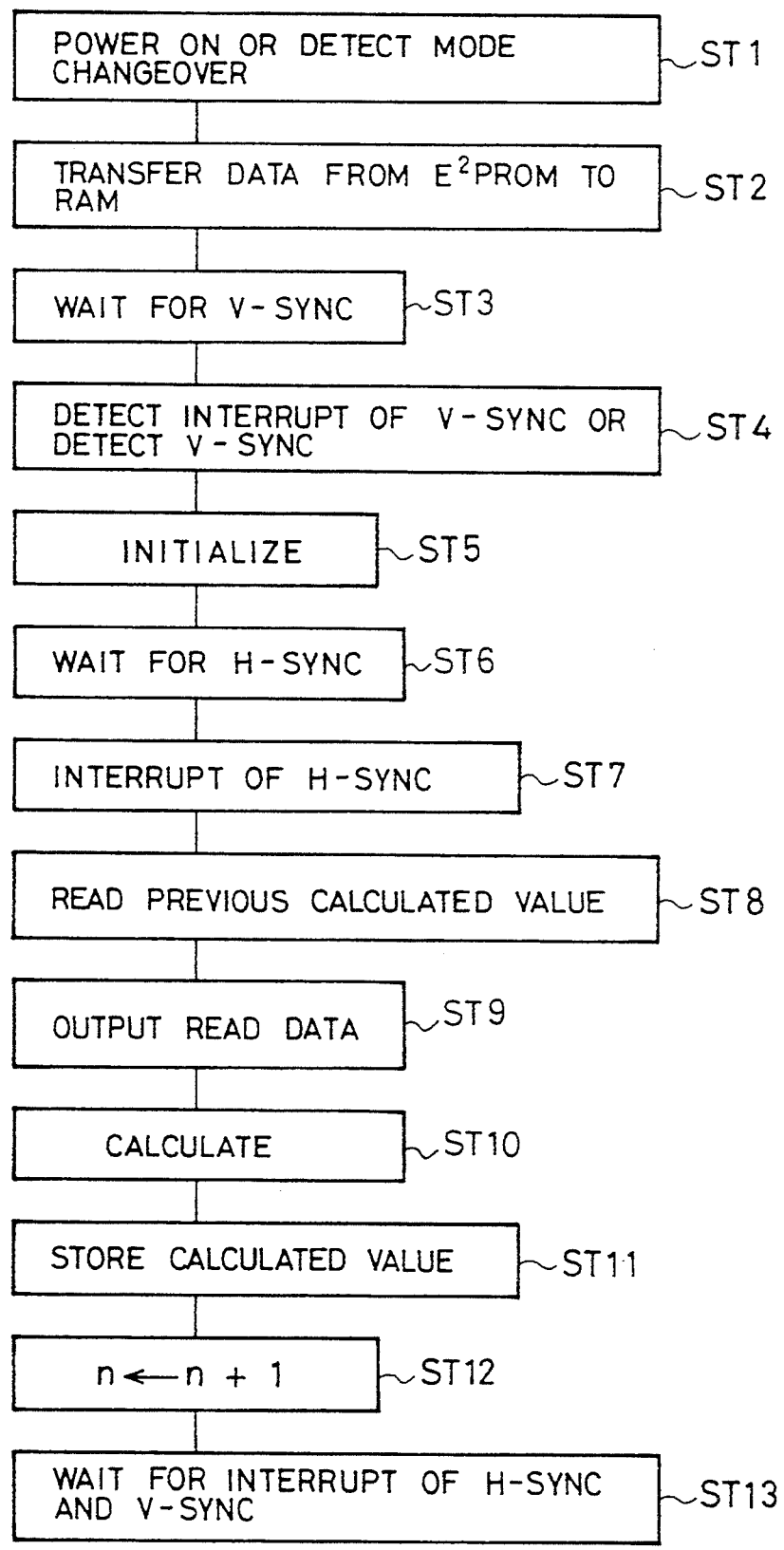
FIG. 5 is a flowchart for describing the distortion correcting operation.

The operation of a program set inside the DSP 15 will now be described using a flowchart shown in FIG. 5.

When a power switch is turned ON in Step ST1 or a change in resolution is made, i.e., when a change in the mode of a vertical frequency is detected, the DSP 15 brings the parameters A through E corresponding to the optimum values from the E²PROM 16 to the RAM 15c in Step ST2. Next, the DSP 15 waits for the incoming of the V-SYNC 12 in Step ST3. Further, when the DSP 15 detects an interrupt or reads an I/O port so as to detect the V-SYNC 12 in Step ST4, the DSP 15 establishes an initial condition, for example, clears the value of n, sets the value of $n_T$ in Step ST5. Thereafter, the DSP 15 waits for the incoming of the H-SYNC 11 in Step ST6.

Next, when the DSP 15 receives an interrupt of the H-SYNC 11 in Step ST7, the DSP 15 reads in Step ST8 the values which have been calculated at the previous time and stored and outputs the same as the data 18 in Step ST9. Then, the $y_1$, $y_2$ and $(y_1+y_2)$ are calculated this time in Step ST10 and the results of calculation are stored in the RAM 15c in Step ST11. After the value of n has been incremented by one in Step ST12, the DSP 15 then waits for the incoming of either the next H-SYNC 11 or the next V-SYNC 12 in Step ST13. When the H-SYNC 11 is then supplied to the DSP 15, the routine is returned to Step ST7 and the routines executed in Steps ST7 through ST13 are repeated so as to successively correct scanning lines. Further, when the V-SYNC 12 is supplied to the DSP 15, the routine is returned to Step ST4 and the routines executed in Steps ST4 through ST13 are repeated so as to repeatedly correct left and right distortions on the screen.

In the present embodiment, the parameters A through E for correcting the typical left and right distortions such as the pin-cushion distortions, the SEAGULL distortions are set to the E²PROM 16. Further, the DSP 15 reads the parameters for every scanning lines respectively to thereby correct the left and right distortions. However, in the present invention, the parameters set to the storing means may be changed as needed. Further, the length of the scanning line may be corrected for each line by the DSP 15 without using the storing means.

EMBODIMENT 2

Another embodiment of the raster left-and-right distortions correcting apparatus according to the present invention will now be described below.

The length of each scanning line is adjusted for each line by the aforementioned method using the circuit shown in FIG. 1 to thereby enable the left and right distortions to be corrected. It is however difficult to actually adjust the length of the scanning line for each line. Besides, a lot of time is required to adjust the length of each scanning line. Further, since a memory for storing therein correction data corresponding to the total number of scanning lines $n_T$ is required, an increase in cost is developed. Therefore, if a simple correcting method rather than the above method is used in practice, then a product is easy to develop.

A method of correcting distortions using the aforementioned simple correcting method will next be described below.

When distortions shown in FIG. 6(b) appear on a normal raster shown in FIG. 6(a), for example, attention is paid onto the raster every 16 lines, for example, starting from the first line. In FIG. 6(b), a correction value with respect to the 17th line $n_{17}$ is zero and the 33rd line $n_{33}$ is corrected using a correction value $\Delta_{33}$ shown in FIG. 6(c) so as to reach the same line length as that of the $n_{17}$. Correction values between the $n_{17}$ and $n_{33}$ are linearly interpolated. Further, lines from the $n_{33}$ to the 49th line corresponding to the next 16th line are corrected based on the correction value $\Delta_{49}$ in the same manner as described above. Thereafter, correction values between the $n_{33}$ and the $n_{49}$ are successively linearly interpolated in the same manner as described above. The correction and interpolation are hereinafter carried out every 16 lines in the same manner as described above.

The correction values $\Delta_0$, $\Delta_{17}$, $\Delta_{33}$, $\Delta_{49}$ ... shown in FIG. 6(c) every 16 lines are stored in the E²PROM 16 in advance. The excess and deficiency of the correction values due to a change in the line length and a change in the vertical frequency are adjusted by uniformly multiplying the respective correction values $\Delta_0$, $\Delta_{17}$, $\Delta_{33}$, $\Delta_{49}$ ... by amplifications. The above method describes the case where the sampling correction is carried out every 16 lines. However, the number of the sampling lines is set for each product according to the total number of lines $n_T$, the left-and-right distortions correction allowable value based on the linear interpolation, the storage or memory capacity of the E²PROM 16, etc.

The present embodiment is effective in a case where left and right distortions shown in FIG. 7 having large deformation in particular are corrected by setting correction values as needed.

EMBODIMENT 3

A further embodiment of the raster left-and-right distortions correcting apparatus according to the present invention will now be described below.

FIG. 8 is a view showing the structure of the raster left-and-right distortions correcting apparatus illustrating the present embodiment. The elements of structure similar to those employed in the above embodiment shown in FIG. 1 are identified by like reference numerals and their description will therefore be omitted. In FIG. 8, reference numeral 40 indicates a user operation unit operated when a desired scanning line is specified and the length of the scanning line is increased or decreased by a desired amount when the left and right distortions on the raster are adjusted. Reference numeral 50 indicates a video signal output unit for outputting a video signal, which includes a brightness gain control circuit 51 for raising the brightness of each of both ends of the desired scanning line specified by the user operation unit 40 to thereby output a signal displayed on the screen.

The user operation unit 40 will be described in detail. Reference numeral 41 indicates a raster width increase/decrease signal generating circuit for supplying a signal for increasing or decreasing the length of each scanning line to the DSP 15. Reference numeral 42 indicates a signal increase switch depressed when the length of each scanning line is made longer. Further, reference numeral 43 indicates a signal decrease switch depressed when the length of each scanning line is made shorter. The switches 42 and 43 and the raster width increase/decrease signal generating circuit 41 form a control or adjust signal generating means for generating a signal for controlling or adjusting the length of each scanning line at the DSP 15. Designated at numeral 44 is a control or adjust mode switch depressed in a left-and-right distortions control mode and reference numeral 45 indicates a mark up-switch for moving upward a mark indicative of a decision made as to which scanning line is being adjusted on a CRT screen. Reference numeral 46 indicates a mark down-switch depressed when the mark is lowered. These switches 45 and 46 form a scanning line designating or specifying means for specifying a scanning line to be adjusted. Reference numeral 51 indicates the brightness gain control circuit in the video signal output unit 50. In the present embodiment, the brightness gain control circuit serves as a gain control circuit (luminance or brightness controlling means) for increasing the brightness of a portion of a scanning line, e.g., the brightness of each of both ends of the scanning line when the above mark is displayed on the screen to thereby make it brighter. The digital signal processing circuit (DSP) 15 employed in the present embodiment has a function for correcting the respective scanning lines and detecting an operation executed by the user operation unit 40 to thereby effect a left-and-right distortions correcting process peculiar to the present embodiment. In particular, the DSP 15 has an operation time detecting function for detecting a time interval during which the mark up-switch 45 and the mark down-switch 46 are being depressed and sending a signal indicative of the position of the mark to the brightness gain control circuit 51 to thereby display the mark.

FIG. 9 is a view showing each of CRT screens in the left-and-right distortions adjust or control mode employed in the present embodiment. Reference numeral 52 indicates a scanning line operation region (raster) and reference numeral 53 indicates a white solid screen. Further, reference numeral 54 indicates a mark used to indicate each of portions corresponding to corrected left and right distortions and represented as a region having the background brighter than that of other region.

The operation of the present embodiment will now be described below.

Figure 10:
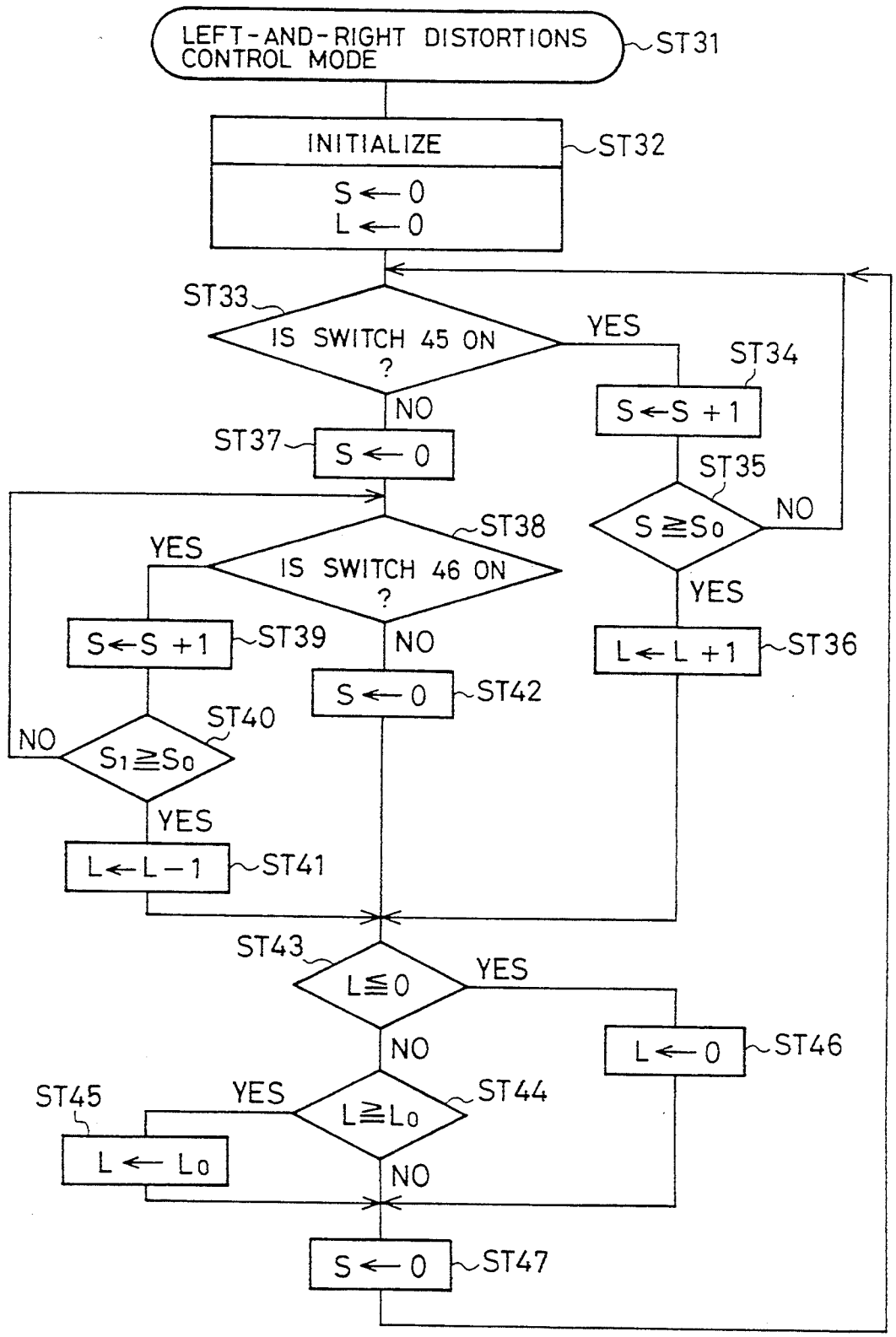
FIG. 10 is a flowchart for explaining the operation of a DSP employed in the raster left-and-right distortions correcting apparatus shown in FIG. 8.

FIG. 10 is a flowchart for describing a control or adjust mode program employed upon correcting the left and right distortions. A description will be made of it with reference to FIG. 10. When the control mode switch 44 of the user operation unit 40 is first turned ON, the DSP 15 detects a changeover to the left-and-right distortions control mode in Step ST31. Then, the DSP 15 initially sets various parameters in Step ST32. A parameter S corresponds to a count parameter indicative of a time interval necessary for the mark up-switch 45 or the mark down-switch 46 required to advance a left-and-right distortions adjusting or control line by one or lower it by one to be continuously held ON. A symbol S0 indicates a default value of that time interval. A parameter L denotes a line number of a left-and-right distortions correction scanning line.

When the initialization is completed in Step ST32, it is decided in Step ST33 whether or not the mark up-switch 45 is in an ON state. If the answer is YES in Step ST33, then the procedure proceeds to two branch routines in Steps ST34 and S35. The number of times in which the procedure continuously branches, i.e., an ON-holding time interval of the switch 45 is counted by incrementing a count S. When the count S is more than or equal to the default value S0, i.e., when the mark up-switch 45 is held ON for a predetermined period in Step ST35, the routine procedure proceeds to Step ST36. In Step ST36, the left-and-right distortions correction line number L is incremented by 1.

If, on the other hand, the answer is NO in Step ST33, then the count S is cleared to zero in Step ST37. It is next decided in Step ST38 whether or not the mark down-switch 46 has been turned ON. If the answer is YES in Step ST38, then the count S is counted up in Step ST39 in a manner similar to Step ST34. When it is then detected in Step ST40 that the mark down-switch 46 has been held ON, the routine procedure proceeds to Step ST41. In Step ST41, the present left-and-right distortions correction line number L is decremented by 1.

After the routine in Step ST36 or ST41 has been executed, the value of a line L to be processed is controlled in Steps ST43, ST44, ST45 and ST46 not so as to be less than or equal to "0" or more than or equal to the maximum number of vertical lines Lo. That is, if the value of the line L to be processed is less than or equal to "0" in Step ST43, then the line L to be processed is maintained at "0" in Step ST46. If the value of the line L to be processed is more than or equal to the maximum number of vertical lines Lo in Step ST44, then the value of L is maintained at the maximum number of vertical lines Lo in Step ST45. The count S is temporarily cleared to "0" to proceed the next cycle in Step ST47.

A left-and-right distortions correcting process of the DSP 15, which includes the above adjust or control display mode, will next be described below with reference to a flowchart shown in FIG. 11.

When an interrupt of the H-SYNC 12 is detected in Step ST48, the left-and-right distortions correcting process employed in the respective embodiments referred to above is carried out in Step ST49. Next, a correction line number n is incremented by 1 in Step ST50. When it is detected in Step ST51 that the present mode is of the control mode, it is determined in Step ST52 whether or not the correction line number n falls between the correction line number L and the sum of the correction line number L and a predetermined default value α. If the answer is YES in Step ST52, then the brightness (which corresponds to the brightness of the background) is made much greater than that on the normal screen in Step ST53. Thus, when the mark up-switch 45 is held ON in FIG. 6, that is, during a processing period of from a loop of Steps ST33, ST34 and ST35 at the number of times corresponding to S0 to a route to Step ST36, the portions (corresponding to left-and-right distortions correcting portions of a raster) whose background is partially bright as shown in FIG. 9, is moved from an upper position to a lower position of the screen as in the case of from FIG. 9(a) to FIG. 9(b). When, on the other hand, the mark down-switch 46 is turned ON, the portions corresponding to the marks 54 are moved from the lower position to the upper position of the screen as in the case of from FIG. 9(b) to FIG. 9(a). When either the signal increase switch 42 or the signal decrease switch 43 in the user operation unit 40 is turned ON in Step ST54 after the left-and-right distortions correcting portions have been displayed as described above, the raster width increase/decrease signal generating circuit 41 outputs a distortion correction line increase/decrease signal so as to increase or decrease the length of an nth scanning line and effect fine adjustment on its length.

In the present embodiment, as described above, the marks 54 which can brighten both ends of each scanning line on the screen upon correcting the left and right distortions of the raster, are displayed on the screen and either the signal increase switch 42 or the signal decrease switch 43 is turned ON. Therefore, left and right distortions of a desired scanning line can be more effectively adjusted.

Figures 12A, 12B:
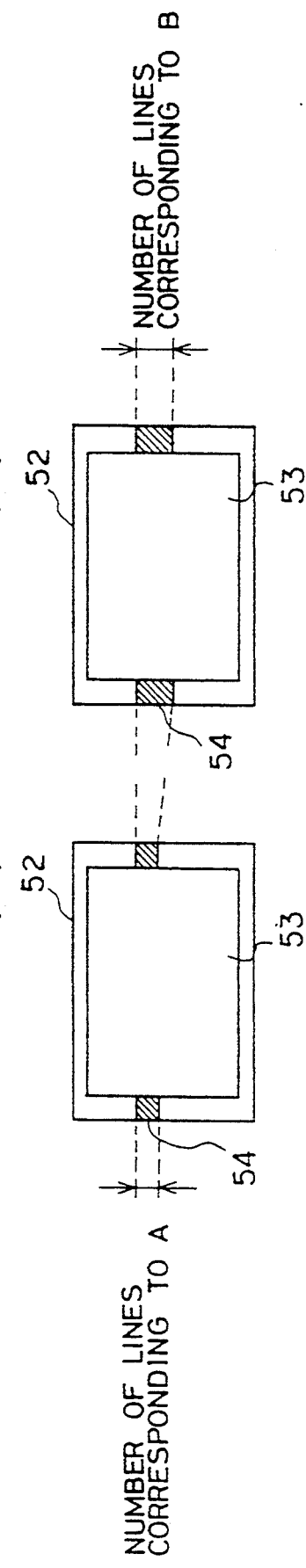
FIGS. 12(a), (b), (c), (d) and (e) are a view for describing one example of a display screen used in a raster left-and-right distortions correcting apparatus according to a further embodiment of the present invention.
Figure 12E:
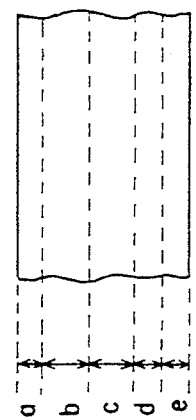
Figure 12D:
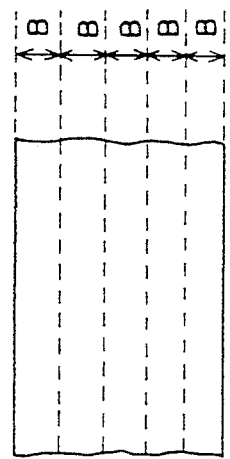
Figure 12C:
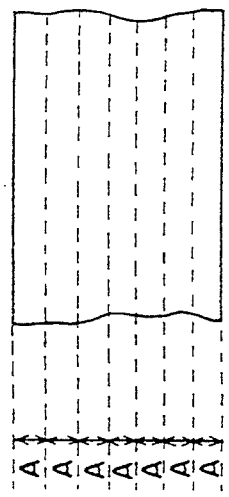

Incidentally, the present embodiment describes, as an illustrative example, a case where the processing is started upon interruption of the H-SYNC 12 in Step ST48 of FIG. 11. However, the H-SYNC 12 may be detected by sensing or reading the I/O port. Further, the present embodiment also shows the case where the marks are displayed on the screen by increasing the brightness for each scanning line. However, marks may be displayed on the screen every plural number of lines by simultaneously increasing the brightness of the plurality of number of scanning lines as shown in FIGS. 12(a) and 12(b). In this case, specified points may be moved upward and downward every given number of lines, e.g., every sampling number of lines A and B as illustrated in FIGS. 12(c) and 12(d). Alternatively, scanning lines may be specified or designated every desired number of lines as shown in FIG. 12(e).

Figure 13:
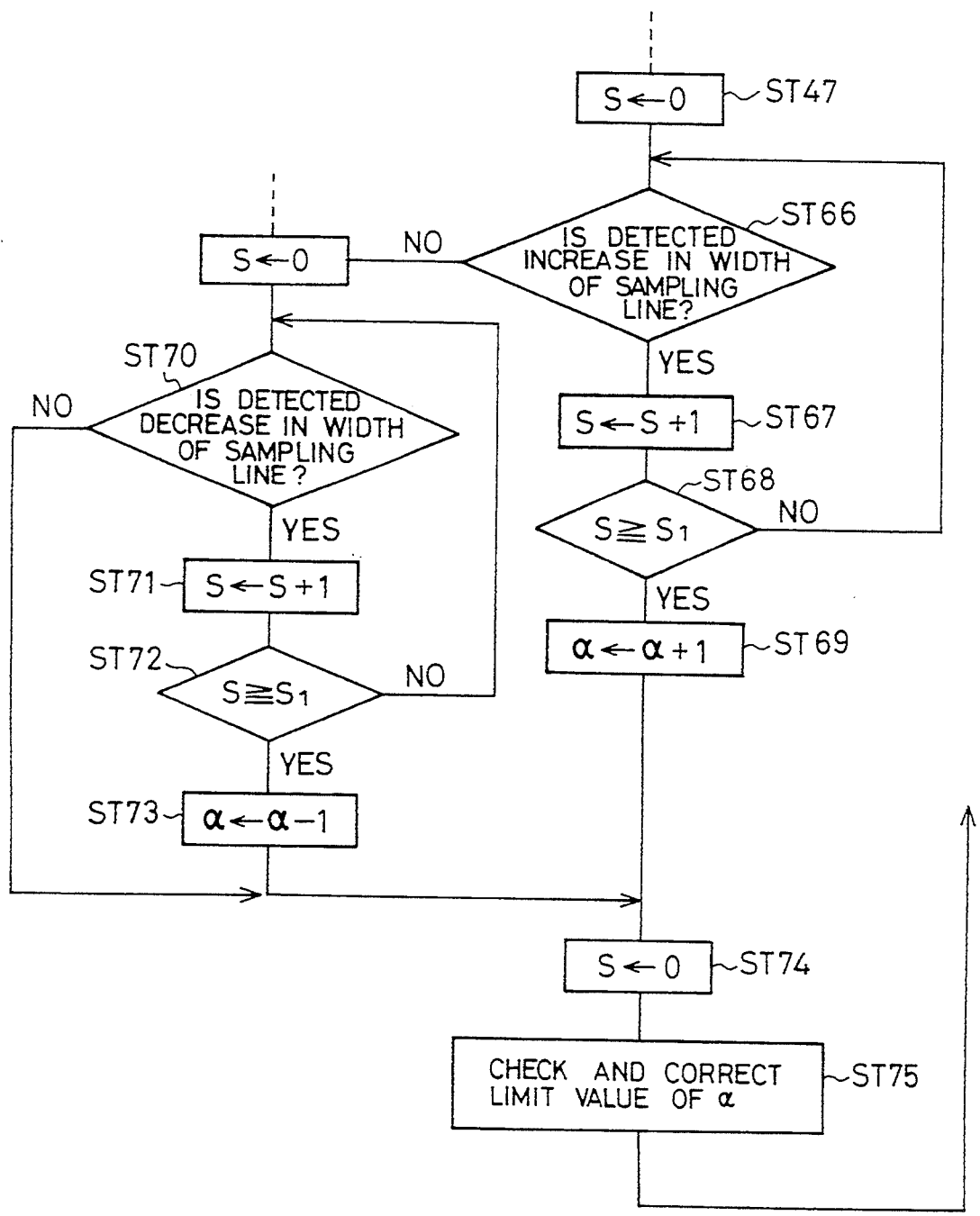
FIG. 13 is a flowchart for describing the operation of the raster left-and-right distortions correcting apparatus illustrated in FIG. 12.

FIG. 13 is a flowchart for describing one example of a sequential process at the time that scanning lines are specified every a plurality of number of lines. A line display position is determined in accordance with the flowchart shown in FIG. 11 and the increase and decrease in the number of lines to be displayed is carried out after Step ST47. When an increase in the number of sampling lines is first detected in Step ST66, a count S is incremented by 1 in Step ST67. It is then decided in Step ST68 whether or not the count S is more than or equal to a predetermined default value S1. The routines in Steps ST66 through ST68 are repeated until the count S reaches the predetermined value and more. If the answer is YES in Step ST68, then a display number α is incremented by 1 in Step ST69. If, on the other hand, the answer is NO in Step ST66, then the routine procedure proceeds to Step ST70. When a decrease in the number of the sampling lines is detected in Step ST70, a count S is incremented by 1 in Step ST71. Thereafter, the routines in Steps ST70 through ST72 are repeated until the count S reaches a predetermined default value S1 and more. If the count S is greater than the count S1 in Step ST72, then a display number α is decremented by 1 in Step ST73. Then, the count S is temporarily cleared to "0" in Step ST74. When the display number α is negative in Step ST75, it is changed to "1". When the display number α exceeds the total number of lines, it is changed to a numerical value corresponding to the number of lines which falls within the total number of lines to thereby set and process a limit of the display number α. Thus, display lines at correction points on the screen are displayed in plural form.

EMBODIMENT 4

Figure 14A:
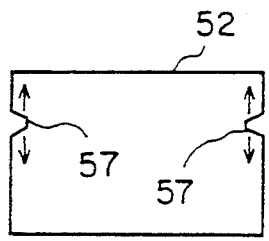
FIGS. 14(a) and (b) are a view for explaining another example of the display screen used in the raster left-and-right distortions correcting apparatus according to the present invention.
Figure 15:
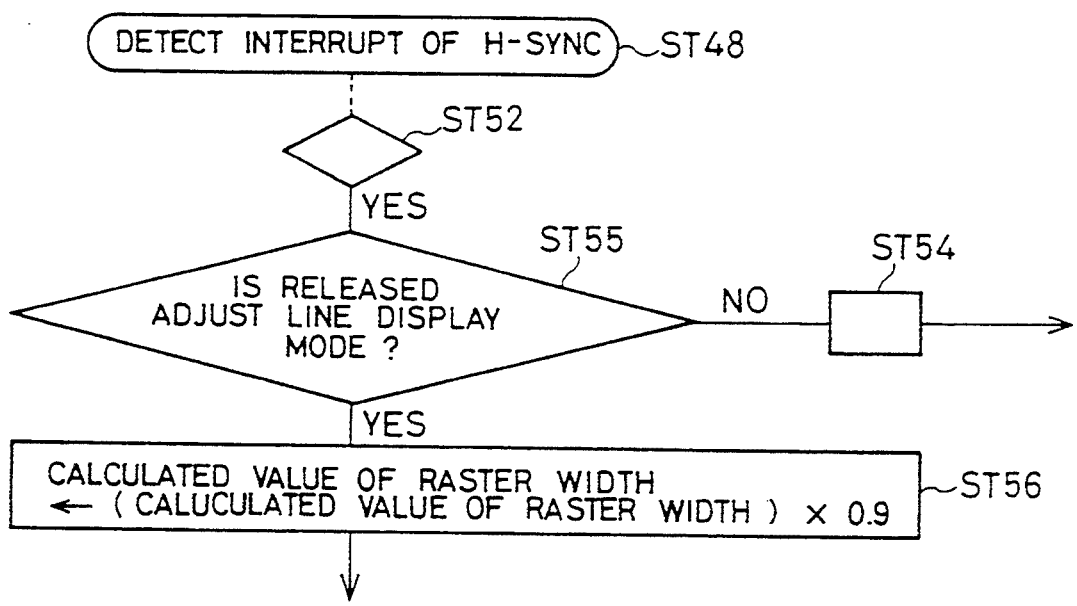
FIG. 15 is a flowchart for describing the operation of the raster left-and-right distortions correcting apparatus according to the present invention.

The above embodiment 3 has described, as an example, a case where the brightness of the portion of both ends of each scanning line is raised so as to display the correction lines. However, both ends of the scanning line may be displayed in either a hollowed or extended state. In this case, the routine in Step ST53 on the flowchart shown in FIG. 11 is executed in the following manner. That is, the value of the width of the following scanning line, which has been already calculated in accordance with the left-and-right distortions correcting process (in Step ST49), is replaced by a value reduced to 10% of its value, for example, as shown in FIG. 15. As a result, portions of a distortion adjusting or correcting line are hollowed inside as shown in FIG. 14(a), so that the position of the scanning line to be processed is displayed on the screen.

Figure 14B:
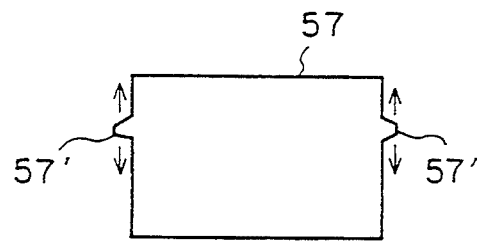
Figure 16:
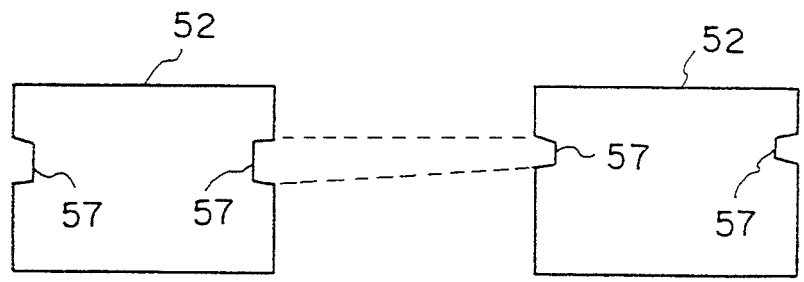
FIG. 16 is a view for explaining a further example of the display screen used in the raster left-and-right distortions correcting apparatus according to the present invention.

Further, when a value to processed in Step ST56 of FIG. 15 is set to a value greater than 1, e.g., 1.1 as an alternative to 0.9, portions of each distortion correcting line projects toward both sides as illustrated in FIG. 14(b). Thus, the distortion correcting lines are displayed by partially varying the widths of the rasters. After the distortion correcting portions have been recognized, a user switch or the like is used to recognize the release of a correcting or adjusting line display mode and either the DSP 15 or another processor effects distortion adjustment on the distortion correcting recognized line. A decision as to whether or not the adjusting line display mode has been released is made in Step ST55 on the flowchart shown in FIG. 15. Even in these cases, a process similar to the above process may be carried out every a plurality of number of lines as shown in FIG. 16.

EMBODIMENT 5

Figure 17:
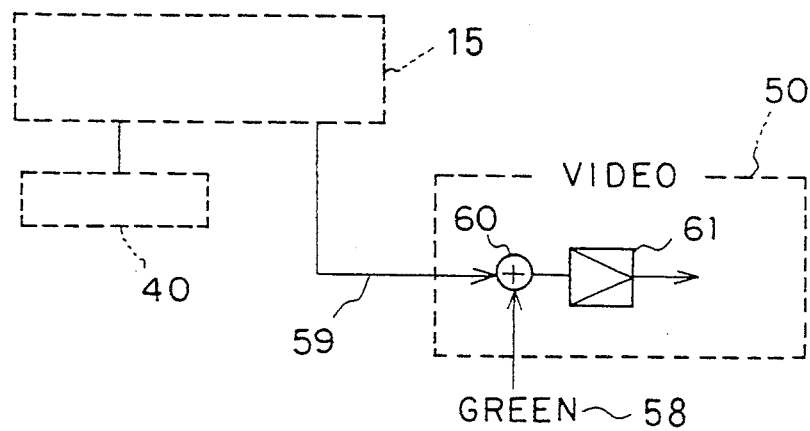
FIG. 17 is a block diagram illustrating a raster left-and-right distortions correcting apparatus according to a still further embodiment of the present invention.

FIG. 17 is a block diagram showing a still further embodiment of the present invention. The same elements of structure as those employed in each of the above embodiments are identified by like reference numerals and their description will therefore be omitted. In the same drawing, reference numeral 59 indicates a video signal for displaying distortion control or adjust points, which is supplied from a DSP 15. Reference numeral 58 indicates a GREEN video signal, for example, of RGB video signals supplied from a signal generator such as a personal computer electrically connected to an indicator or display device. Reference numeral 60 indicates a mixer (color-signal mixing means) for mixing the video signals 58 an 59, and reference numeral 61 indicates a video amplifier.

The operation of the present embodiment will now be described below.

Figure 18:
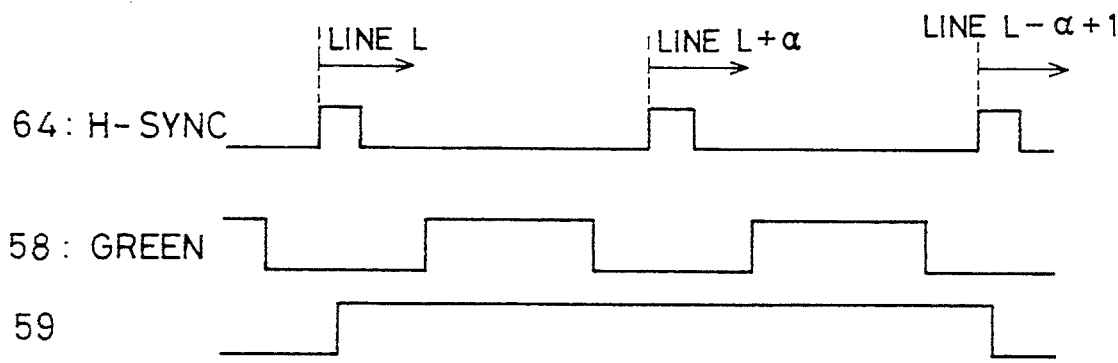
FIG. 18 is a timing chart for describing signals which appear at respective parts of the raster left-and-right distortions correcting apparatus shown in FIG. 17.
Figure 19:
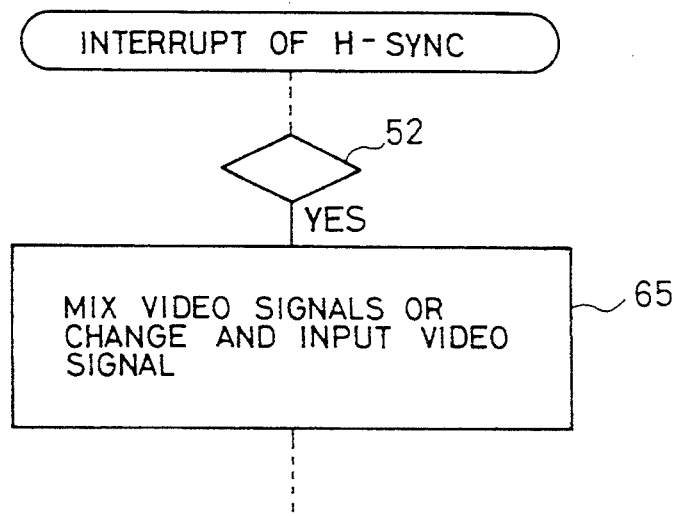
FIG. 19 is a flowchart for explaining the operation of the raster left-and-right distortions correcting apparatus shown in FIG. 17.
Figure 20:
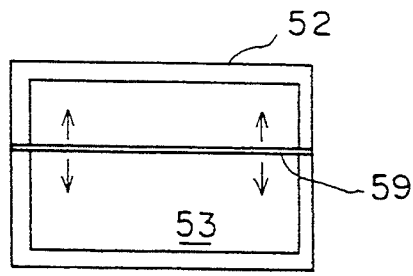
FIG. 20 is a view for describing one example of a display screen used in the raster left-and-right distortions correcting apparatus shown in FIG. 17.

FIG. 18 is an output timing chart of each of the video signals employed in the present embodiment. FIG. 19 is a flowchart for describing a program used for the display of a distortion correcting or adjusting line. When the horizontal synchronizing signal is supplied in a manner similar to each of the above embodiments, the DSP 15 effects a distortion correction on each of horizontal scanning lines. When an adjust or control mode switch 44 is turned ON in this condition, the DSP 15 selects a distortion adjust or control mode and detects an on-period of either a mark up-switch 45 or a mark down-switch 46. In the present embodiment, the DSP 15 generates a video signal 59 indicative of a corresponding horizontal scanning line so as to be supplied to a video signal output circuit 50. The mixer 60 in the video signal output circuit 50 mixes the video signal 59 indicative of distortion adjust points supplied from the DSP 15 with the GREEN video signal 58 supplied from the signal generator in synchronism with a horizontal synchronizing signal 64. Further, the video amplifier 61 amplifies the mixed signal so as to be outputted to and displayed on the screen of the CRT (Step ST65). Thus, a green line 59 is displayed on the CRT screen as a scanning line for correcting or controlling the distortions so that it can be moved upward and downward as shown in FIG. 20. When the position of the scanning line for correcting or adjusting the distortions is decided, the length of the displayed scanning line is further fine-adjusted by turning ON each of signal increase and decrease switches 42 and 43.

Figure 21:
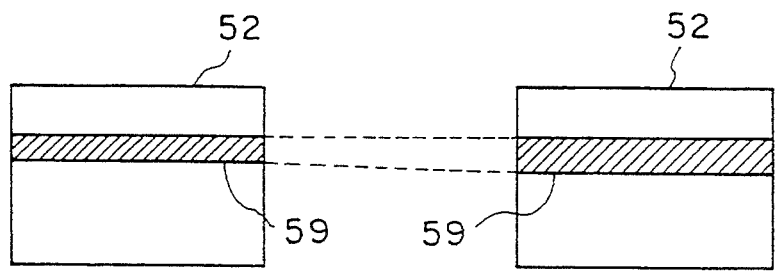
FIG. 21 is a view for describing another example of the display screen used in the raster left-and-right distortions correcting apparatus according to the present invention.
Figure 22:
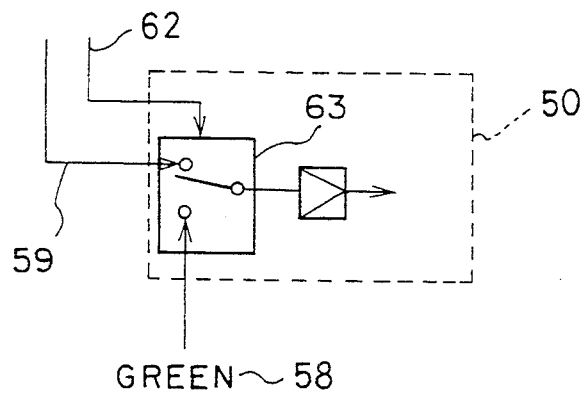
FIG. 22 is a block diagram illustrating a raster left-and-right distortions correcting apparatus according to a still further embodiment of the present invention.

In the present embodiment, as described above, the adjustment or control of the distortions is further facilitated because the distortion adjusting line is displayed on a white solid screen 53 as a green belt-like line. The present embodiment describes the case where the video signal 59 is mixed with the GREEN video signal 58 alone and the mixed signal is displayed on the screen. However, the video signal 59 may be mixed with either RED or BLUE video signal simultaneously with the GREEN video signal. Alternatively, the video signal 59 may be mixed with any two of the RGB video signals. In the present embodiment, the green line is displayed on the screen for each distortion adjusting line. However, it may be displayed on the screen every plural number of lines as shown in FIG. 21. In the present embodiment as well, the video signal indicative of the scanning line for adjusting the distortions is mixed with the GREEN video signal supplied from the signal generator by the mixer 60. However, a signal selector 63 switched in response to a control signal 62 supplied from either the DSP 15 or the personal computer may be disposed as an alternative to the mixer 60 as shown in FIG. 22 so that only a video signal 59 supplied from the DSP 15 is selected during a distortion adjusting-line display period and only a GREEN video signal 58 is selected during other period.

EMBODIMENT 6

Figure 23:
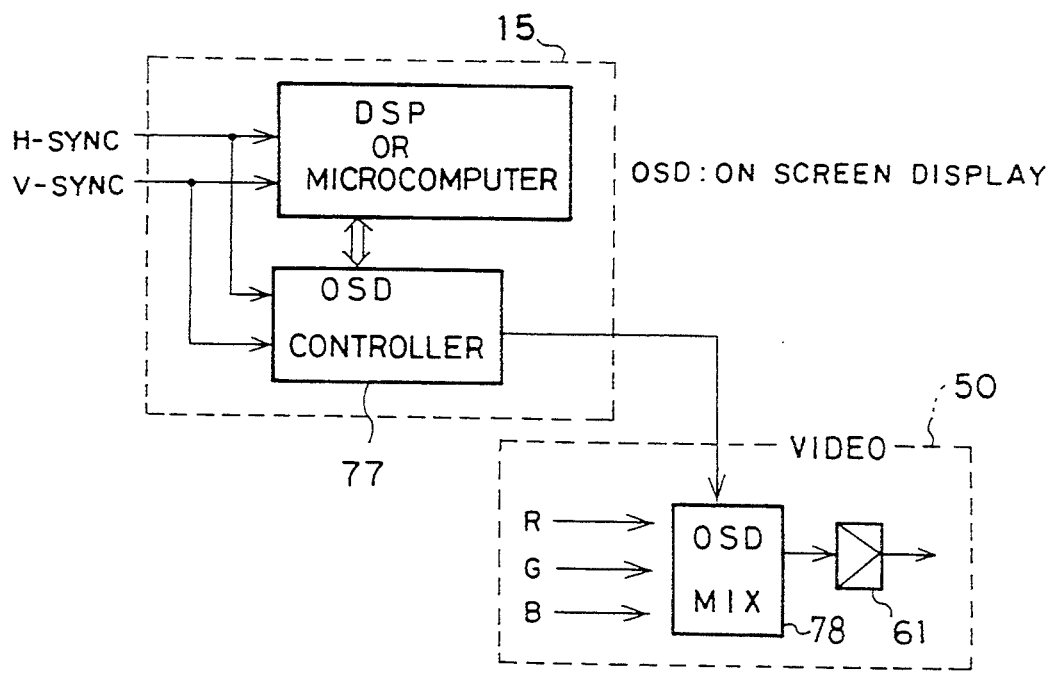
FIG. 23 is a block diagram showing a raster left-and-right distortions correcting apparatus according to a still further embodiment of the present invention.
Figure 29:
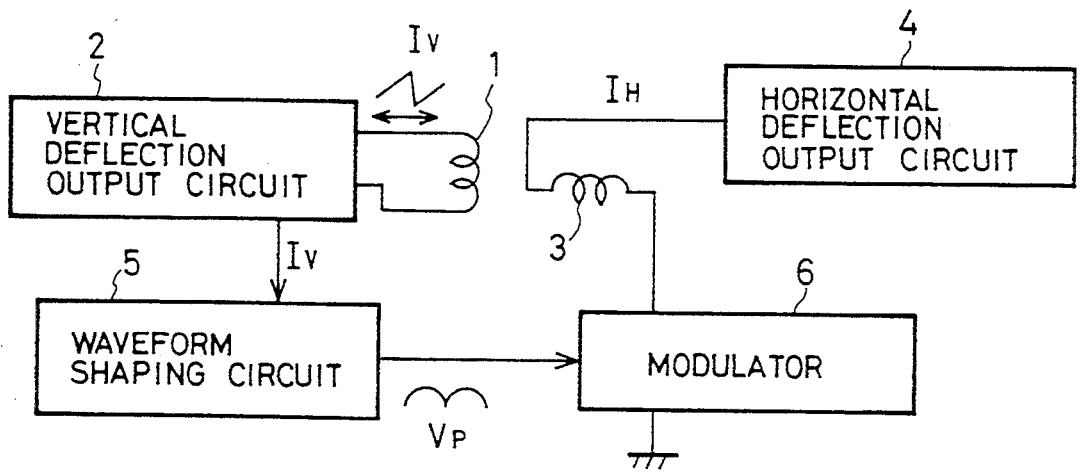
FIG. 29 is a block diagram illustrating a conventional raster left-and-right pin-cushion distortions correcting apparatus.
Figure 30:
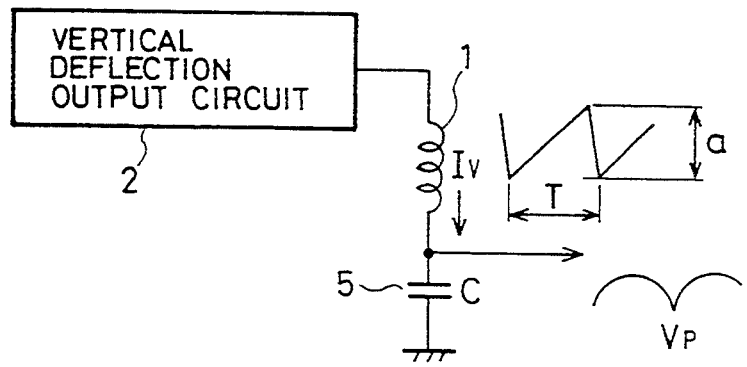
FIG. 30 is a view showing the configuration of a waveform shaping circuit employed in the raster left-and-right pin-cushion distortions correcting apparatus shown in FIG. 29.
Figure 31:
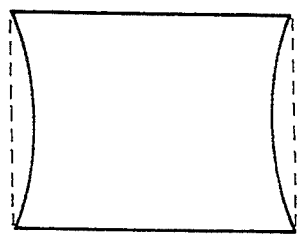
FIG. 31 is a view for describing left-and-right pin-cushion distortions.

FIG. 23 is a block diagram showing a raster left-and-right distortions correcting apparatus according to a still further embodiment of the present invention. The elements of structure as those employed in each of the above embodiments are identified by like reference numerals and their description will therefore be omitted. In the same drawing, reference numeral 77 indicates an on screen controller (image signal generating means) such as a character generator or the like for receiving distortion correction data from a DSP 15, converting the received information into a video signal indicative of letters, or an image or characters and outputting the same therefrom. Reference numeral 78 indicates an on screen mixer for mixing the image signal supplied from the on screen controller 77 with RGB signals supplied from a signal generator.

The operation of the raster left-and-right distortions correcting apparatus will now be described below.

The DSP 15 corrects left and right distortions every scanning lines based on horizontal and vertical synchronizing signals in a manner similar to each of the aforementioned embodiments. When respective switches of a user operation unit 40 are activated under a distortion control or adjust mode, the DSP 15 outputs distortion control or adjust data to the on screen controller 77. The on screen controller 77 generates an image signal indicative of arrow characters at positions on a scanning line for effecting distortion adjustment as shown in FIG. 24, for example and outputs the same to the mixer 78. Thus, the mixer 78 mixes the image signal generated from the on screen controller 77 with the RGB video signals and supplies the mixed signal to the screen of a CRT via an amplifier 61. As a result, images shown in FIG. 24 are displayed on the CRT screen. Incidentally, the on screen controller 77 may generate an image signal corresponding to characters indicative of the number of adjusting lines from the distortion adjust data as illustrated in FIG. 25, for example. Alternatively, the on screen controller 77 may generate an image signal indicative of letters and characters as shown in FIG. 26. Further, when distortion adjustment is effected on a plurality of number of scanning lines, arrow characters each indicative of the beginning and end of each scanning line or the number of lines at the beginning and the number of lines to be adjusted may be displayed in the form of letters.

EMBODIMENT 7

FIG. 28 shows a still further embodiment of a raster left-and-right distortions correcting apparatus for automatically adjusting left and right distortions of a raster. In the same drawing, reference numerals 66, 67, 70, 69, 68, 75, 76, 73, 74, 72 and 71 respectively indicate a monitoring display device such as a CRT or the like, an arithmetic unit such as a DSP 15 or a similar microcomputer, a controller for automatically adjusting or measuring distortions, a CCD camera for sensing a raster, an X-Y moving axis for controlling the position of the CCD camera, a top position of a display raster on the display device 66, a bottom position of the display raster on the display device 66, a position control signal for controlling the position of the CCD camera, which is generated from the controller 70, a display raster detection signal supplied from the CCD camera, a signal indicative of a distortion adjust line number, which is outputted from the controller 70 based on the position control signal, and a display raster width control signal controlled by the controller 70.

The operation of the present embodiment will now be described below.

The CCD camera 69 senses the top and bottom positions 75 and 76 on the screen of the display device 66 when in scanning. Data about these positions 75 and 76 are temporarily stored in a buffer of the controller 70. Then, the controller 70 successively supplies adjust line numbers to the DSP 15 from "0" line as the signal 72 indicative of the distortion adjust line number. In synchronism with the signal 72, the controller 70 outputs the signal 73 for controlling the CCD camera 69 so as to reach the position corresponding to the adjust line number to the X-Y moving axis 68. Thus, the CCD camera 69 successively senses adjusting lines. Assuming now that the total number of lines is represented as $L_{total}$, the position control signal 73 can be determined or computed from (position coordinate 75−position coordinate 76)*transmission line number/$L_{total}$+(position coordinate 76). Thus, when the display raster detecting signal 74 sensed by the CCD camera 69 for each line or each given number of lines is supplied to controller 70, the controller 70 determines the raster width control signal 71 from the above computation and sends it to the DSP 67. As a result, the DSP 67 adjusts the length of a corresponding scanning line based on the raster width control signal 71 so as to reach an intended line width.

In the present embodiment as described above, the respective scanning lines are photographically sensed by the CCD camera 69 and the left and right distortions of the raster can be automatically adjusted based on the result of sensing. In the present embodiment, the distortions are adjusted every scanning lines. As an alternative, however, scanning lines may be suitably sampled every a plurality of number of lines so that the length of each sampled scanning line is detected and adjusted.

Having now fully described the invention, it will be apparent to those skilled in the art that many changes and modifications can be made without departing from the spirit or scope of the invention as set forth herein.

What is claimed is:

1. A raster left-and-right distortions correcting apparatus comprising:
   storing means for storing parameters for correcting left and right distortions of a raster;
   a digital signal processing circuit for performing a predetermined arithmetic operation using the parameters stored in said storing means and outputting data for deciding a length of each of scanning lines;
   a D-A converter for converting the data outputted from said digital signal processing circuit into an analog voltage;
   a sawtooth wave generator for generating a sawtooth wave voltage synchronized with a horizontal synchronizing signal;
   a comparator for comparing the analog voltage produced from said D-A converter with the sawtooth wave voltage generated from said sawtooth generator; and
   a switch for switching a power source voltage controlled based on the output of said comparator and supplied to a horizontal output circuit.

2. A raster left-and-right distortions correcting apparatus according to claim 1, wherein said digital signal processing circuit performs the predetermined arithmetic operation during a present horizontal scan period and makes use of a result of the operation during a next horizontal scan period.

3. A raster left-and-right distortions correcting apparatus comprising:
   storing means for storing correction values every a plurality of number of scanning lines on a raster;
   a digital signal processing circuit for performing a predetermined arithmetic operation using the correction values stored in said storing means and outputting data for deciding lengths of the scanning lines every said scanning lines and data obtained by determining lengths of scanning lines other than said scanning lines by interpolation;
   a D-A converter for converting the data outputted from said digital signal processing circuit into an analog voltage;
   a sawtooth wave generator for generating a sawtooth wave voltage synchronized with a horizontal synchronizing signal;
   a comparator for comparing the analog voltage produced from said D-A converter with the sawtooth wave voltage generated from said sawtooth wave generator; and
   a switch for switching a power source voltage controlled based on the output of said comparator and supplied to a horizontal output circuit.

4. A left-and-right distortions correcting apparatus comprising:
   a digital signal processing circuit for determining data for deciding length of each of scanning lines in accordance with a predetermined arithmetic operation and outputting the data;
   a D-A converter for converting the data outputted from said digital signal processing circuit into an analog voltage;
   a sawtooth wave generator for generating a sawtooth wave voltage synchronized with a horizontal synchronizing signal;
   a comparator for comparing the analog voltage produced from said D-A converter with the sawtooth voltage generated from said sawtooth generator;
   a switch for switching a power source voltage controlled based on the output of said comparator and supplied to a horizontal output circuit.

5. A raster left-and-right distortions correcting apparatus according to claim 4, further comprising:
   a user operation unit having scanning line specifying means for specifying a scanning line corresponding to an object for correcting the left and right distortions of said raster and adjust signal generating means for generating a signal for adjusting the length of the scanning line specified by said scanning line specifying means; and
   scanning line position displaying means for displaying the position of the scanning line specified by said scanning line specifying means on the screen.

6. A raster left-and-right distortions correcting apparatus according to claim 5, wherein said scanning line displaying means includes brightness controlling means for raising the brightness of a portion of said specified scanning line to thereby display the position of said specified scanning line.

7. A raster left-and-right distortions correcting apparatus according to claim 5, wherein said scanning line displaying means makes the length of said specified scanning line or the lengths of a plurality of scanning lines including said specified scanning line shorter or longer than the lengths of other scanning lines and displays the same on the screen so as to indicate the position of said specified scanning line.

8. A raster left-and-right distortions correcting apparatus according to claim 5, wherein said scanning line displaying means includes color signal mixing means for superimposing a predetermined color signal on said specified scanning line and displaying the result of superimposition on the screen so as to indicate the position of said specified scanning line.

9. A raster left-and-right distortions correcting apparatus according to claim 5, wherein said scanning line displaying means includes position display image generating means for generating an image signal for indicating the position of said specified scanning line and displaying image on the screen.

10. A raster left-and-right distortions correcting apparatus according to claim 5, wherein said digital signal processing circuit detects raster left-and-right distortions correcting positions according to the time required for a user to operate said user operation unit and supplies a position signal to said scanning line position displaying means based on the result of detection.

11. A raster left-and-right distortions correcting apparatus according to claim 5, wherein said scanning line specifying means specifies a plurality of number of scanning lines.

12. A raster left-and-right distortions correcting apparatus according to claim 10, wherein said digital signal processing circuit detects the number of scanning lines specified according to the time required for the user to operate said user operation unit and supplies a position signal to said scanning line position displaying means based on the result of detection.

* * * * *